United States Patent [19]

Wild

[11] 3,872,500

[45] Mar. 18, 1975

[54] TWO-SPEED DRIVE FOR LINEAR ADAPTER FOR CASSETTE TAPE RECORDER

[75] Inventor: Albert F. Wild, Rochester, N.Y.

[73] Assignee: Tapecon, Inc., Rochester, N.Y.

[22] Filed: May 21, 1973

[21] Appl. No.: 362,428

[52] U.S. Cl. .......... 360/2, 360/94

[51] Int. Cl. .......... G11b 23/94, G06k 7/08

[58] Field of Search .......... 360/2, 94, 88; 274/4 G, 274/4 J; 235/61.11 D

[56] References Cited

UNITED STATES PATENTS

| | | | |
|---|---|---|---|
| 3,404,894 | 10/1968 | Kral | 360/2 |
| 3,610,635 | 10/1971 | Schiff | 360/94 |
| 3,632,894 | 1/1972 | Bretschneider | 360/94 |
| 3,712,973 | 1/1973 | Karl | 360/88 |
| 3,800,321 | 3/1974 | Bolick, Jr. | 360/94 |

*Primary Examiner*—Terrell W. Fears
*Assistant Examiner*—Jay P. Lucas
*Attorney, Agent, or Firm*—Cumpston, Shaw & Stephens

[57] ABSTRACT

A two-speed drive for a linear adapter for a cassette tape recorder has a drive wheel that fits over the take-up shaft of the recorder and engages and drives a pulley. An endless belt passes around the pulley and over the capstan of the recorder for regulating the speed of the pulley when the recorder's pinch roller presses the belt against the capstan. A friction roller is coaxial with the pulley and turns with the pulley approximately tangent to a slot so that a linear recording element can be pressed against the friction roller and driven through the slot.

5 Claims, 2 Drawing Figures

TWO-SPEED DRIVE FOR LINEAR ADAPTER FOR CASSETTE TAPE RECORDER

THE INVENTION IMPROVEMENT

Drives for linear adapters for cassette tape recorders have encountered many problems in smooth and vibration-free running with adequate power. The invention involves recognition of a better way to power a drive for linear adapter for a cassette tape recorder for both smooth running and two-speed operation with adequate power for linear drive purposes. The invention also aims at simplicity, economy, and effectiveness in a substantially vibration-free drive having the advantages of two speeds together with plenty of power.

SUMMARY OF THE INVENTION

The inventive two-speed drive is applied to a linear adapter for a cassette tape recorder that has a capstan, a pinch roller, and a driven take-up shaft. A drive wheel in the adapter has a central opening fitting over the take-up shaft to turn with the take-up shaft for driving a pulley, and an endless belt passes around the pulley and over the capstan between the capstan and the pinch roller to regulate the speed of the pulley when the pinch roller presses the belt against the capstan. The belt is tensioned and guided over the capstan, and a friction roller coaxial with the pulley turns with the pulley at a regulated speed when the pinch roller presses the belt against the capstan and at a faster speed when the pinch roller is clear of the belt and the capstan. A linear drive slot is approximately tangent to the friction roller, and a linear recording element is pressed against the friction roller for traversing the slot.

DRAWINGS

FIG. 1 is a partially cut-away, partially schematic plan view of a preferred embodiment of the inventive drive; and FIG. 2 is a cross-sectional view of the embodiment of FIG. 1 taken along the line 2 — 2 thereof.

DETAILED DESCRIPTION

Figure 1:
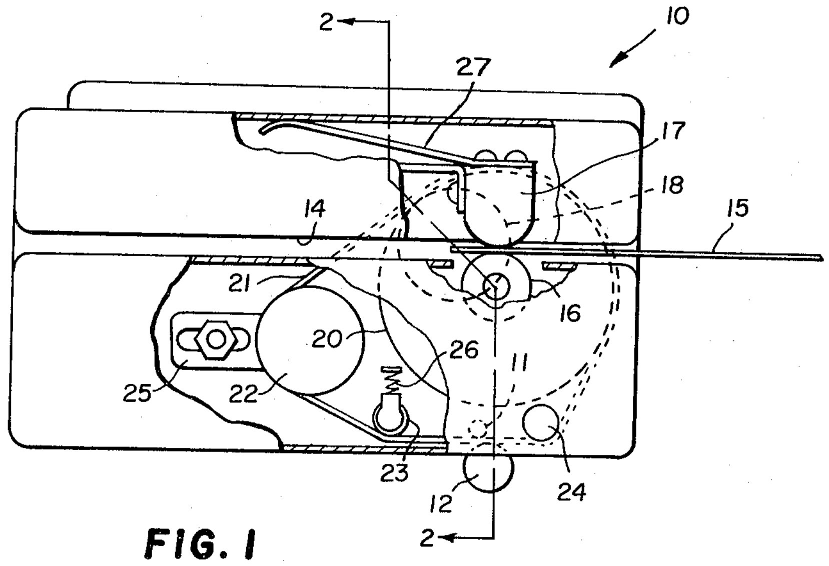
Figure 2:
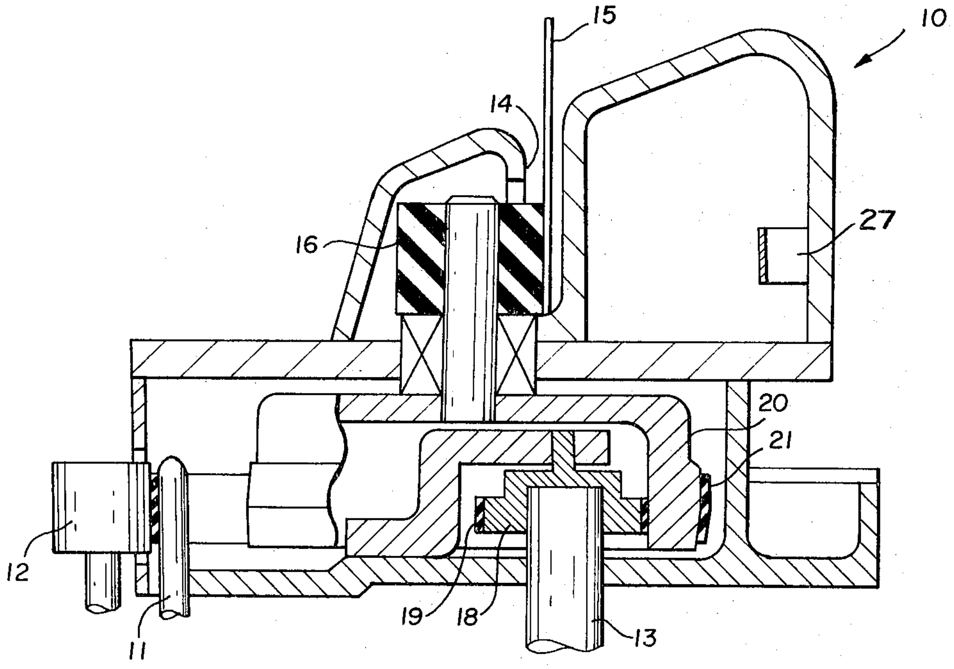

Adapter 10 is shaped for fitting into the cassette slot of a cassette tape recorder represented in the drawings by capstan 11, pinch roller 12, and driven take-up shaft 13. Adapter 10 has a linear slot 14 for playing a linear recording element 15 having at least one linear magnetic track. A friction roller 16 is approximately tangent to slot 14, and a magnetic head 17 is biased against friction roller 16 by a spring 27 for pressing card 15 against friction roller 16 for traversing slot 14. An improved drive for friction roller 16 is described below.

A drive wheel 18 fits over the splines of take-up shaft 13 as illustrated, and drive wheel 18 has a friction rim 19 of a high coefficient of friction material that engages the inside surface of a hollow pulley 20. An endless belt 21 passes around pulley 20, over idler pulley 22, over guide pulleys 23 and 24, and between capstan 11 and pinch roller 12 as illustrated. Idler pulley 22 is preferably carried on an adjustable mount 25 and secured in the desired position at the factory, and guide pulley 23 is preferably biased by spring 26 for tensioning belt 21. Friction roller 16 is then mounted coaxially with pulley 20 as illustrated for driving card 15.

Take-up shaft 13 has plenty of power for turning drive wheel 18 so as to apply plenty of torque to pulley

20. Belt 21 then acts as a speed regulator when pinch roller 12 presses belt 21 against capstan 11. Cassette tape recorders normally have a slip drive for take-up shaft 13 so that belt 21 can regulate pulley 20 to the surface speed of capstan 11 when belt 21 is pinched against capstan 11 by pinch roller 12. This provides a regulated and smooth speed for friction roller 16 which advances at a much slower surface speed than the surface speed of capstan 11 because of the relative sizes of pulley 20 and friction roller 16.

Pinch roller 12 moves clear of belt 21 and capstan 11 when the cassette recorder is operated in a fast forward mode; and then belt 21 slips freely over capstan 11, and take-up shaft 13 advances without slippage and drives wheel 18, pulley 20 and friction roller 16 at a faster speed than the speed regulated by belt 21. This provides a somewhat faster speed for friction roller 16 to advance card 15 through slot 14 at a faster rate.

Belt 21 is preferably formed of a piece of the material used as a base for magnetic tape so it is readily engaged between pinch roller 12 and capstan 11. Also, such material is adequately strong and durable to serve as a reliable belt 21. Many different arrangements of idler and guide pulleys are possible, so long as belt 21 is properly guided and tensioned in its path around pulley 20. Magnetic head 17 can be a stereo head for playing more than one track on card 15, and several magnetic heads 17 can be included for various multi-track operations.

The inventive two-speed drive has many practical advantages in addition to being simple, smooth, and vibration-free. By taking its power from take-up shaft 13, the inventive drive is adequately powerful to overcome friction losses in moving card 15 smoothly through slot 14. Also, two speeds are available both for recording and playing back and this feature can be used in many ways. Cards can be played quickly at high speeds for sorting or scanning purposes, and then played at slower speeds for closer examination of their recordings. For improved fidelity and short messages, the cards can be recorded and played at the faster speed and this might be useful for short passages of music or for data in the form of pulse tones or other sounds requiring high fidelity reproduction. For messages not requiring such high fidelity, such as the human voice, and for generally longer messages, the cards can be played at the slower speed regulated by belt 21 to achieve a greater message length. One track of a card can be played fast to record data or tonal material requiring high fidelity, and another track on the same card can be played more slowly for a voice explanation or accompanying message not requiring as high a fidelity. Messages recorded on cards at slow speeds can be scanned at a higher speed and pitch to sort out special interest cards that are then replayed at the slower recording speed. A stereo magnetic head allows recording on different tracks of the card quite readily by automatically playing one stereo gap when the card is moved at slow speed, and the other stereo gap when the card is moved at high speed. A simple switch modification in the host recorder can make such an arrangement automatic when the correct host switch is used.

Persons wishing to practice the invention should remember that other embodiments and variations can be adapted to particular circumstances. Even though one point of view is necessarily chosen in describing and defining the invention, this should not inhibit broader of related embodiments going beyond the semantic orientation of this application but falling within the spirit of the invention. For example, those skilled in the art will appreciate the various drive wheels, belts, pullies, and friction wheels usable within the scope of the invention.

I claim:

1. A two-speed drive for a linear adapter for a cassette tape recorder having a capstan, a pinch roller, and a driven take-up shaft, said driving comprising:

a. a drive wheel having a central opening for fitting over said take-up shaft to turn with said take-up shaft;
b. a pulley driven by said drive wheel;
c. an endless belt passing around said pulley and over said capstan between said capstan and said pinch roller to regulate the speed of said pulley when said pinch roller presses said belt against the capstan;
d. means for tensioning and guiding said belt over said capstan;
e. a friction roller coaxial with said pulley and turning with said pulley at a regulated speed when said pinch roller presses said belt against said capstan and at a faster speed when said pinch roller is clear of said belt and said capstan;
f. a linear drive slot approximately tangent to said friction roller; and
g. means for pressing a linear recording element against said friction roller for traversing said slot.

2. The drive of claim 1 wherein said regulated speed of the surface of said friction roller is substantially slower than the speed of the surface of said capstan.

3. The drive of claim 1 wherein said drive wheel has a friction rim engaging said pulley.

4. The drive of claim 3 wherein said drive wheel rim engages an inside surface of said pulley.

5. The drive of claim 4 wherein said regulated speed of the surface of said friction roller is substantially slower than the speed of the surface of said capstan.

* * * * *